United States Patent [19]

Neri

[11] Patent Number: 4,700,121
[45] Date of Patent: Oct. 13, 1987

[54] AUTOMATIC SYSTEM FOR CHANGING THE ELECTRICITY SUPPLY SOURCE ON A MOBILE OPERATING ARM UNIT

[75] Inventor: Armando Neri, Bologna, Italy

[73] Assignee: G.D. Societa' Per Azioni, Bologna, Italy

[21] Appl. No.: 860,067

[22] Filed: May 6, 1986

[30] Foreign Application Priority Data

May 10, 1985 [IT] Italy ................................. 3432 A/85

[51] Int. Cl.⁴ .............................................. B60K 1/04
[52] U.S. Cl. ......................................... 320/2; 307/66;
  414/278; 901/6; 318/568
[58] Field of Search ........................... 307/66; 104/34;
  414/278, 281; 901/6, 7; 318/568; 320/2

[56] References Cited

U.S. PATENT DOCUMENTS

| 668,108 | 2/1901 | Mailloux | 104/34 |
| 3,834,563 | 9/1974 | Teti | 104/34 X |
| 4,334,819 | 6/1982 | Hammerslag | 104/34 X |
| 4,450,400 | 5/1984 | Gwyn | 320/2 |
| 4,576,537 | 3/1986 | Inaba et al. | 901/7 |

*Primary Examiner*—Benjamin Dobeck
*Attorney, Agent, or Firm*—Gifford, Groh, VanOphem, Sheridan, Sprinkle and Dolgorukov

[57] ABSTRACT

An automatic system for changing the electricity supply source on a mobile unit with an operating arm the system comprising a station for storing the electricity supply sources, means for prearranged positioning of the mobile unit in relation to the station, and means for activating the arm for picking up the rundown electricity supply source and replacing it with a new electricity supply source withdrawn from the storage station.

11 Claims, 3 Drawing Figures

AUTOMATIC SYSTEM FOR CHANGING THE ELECTRICITY SUPPLY SOURCE ON A MOBILE OPERATING ARM UNIT

BACKGROUND OF THE INVENTION

The present invention relates to an automatic system for changing the electricity supply source on a mobile operating-arm unit.

One of the major problems involved in mobilizing operating-arm (robot) units over relatively long distances, at times ranging over hundreds of metres, is the electricity supply of the units themselves. If the said mobile units are fitted with electricity supply batteries, the problem also exists of how to recharge the batteries easily and, preferably, automatically, without having to arrest operation of the units for the time required for recharging.

SUMMARY OF THE INVENTION

The aim of the present invention is therefore to provide a system enabling the said operating-arm units to be supplied electrically, while at the same time enabling the said units to travel over fairly long distances, without arresting operation of the said units for the time required for recharging the electricity supply sources, thus enabling the said units to be sent rapidly back into operation.

With this aim in view, according to the present invention, there is provided an automatic system for changing the electricity supply source on a mobile unit with an operating arm, characterised by the fact that it comprises a station for storing the electricity supply sources, means for prearranged positioning of the mobile unit in relation to the storage station, and means for activating the arm for picking up the rundown electricity supply source and replacing it with a new electricity supply source withdrawn from the storage station.

BRIEF DESCRIPTION OF THE DRAWINGS

The present invention will be described by way of example with reference to the accompanying drawings in which.

DETAILED DESCRIPTION OF THE INVENTION

Figure 1:
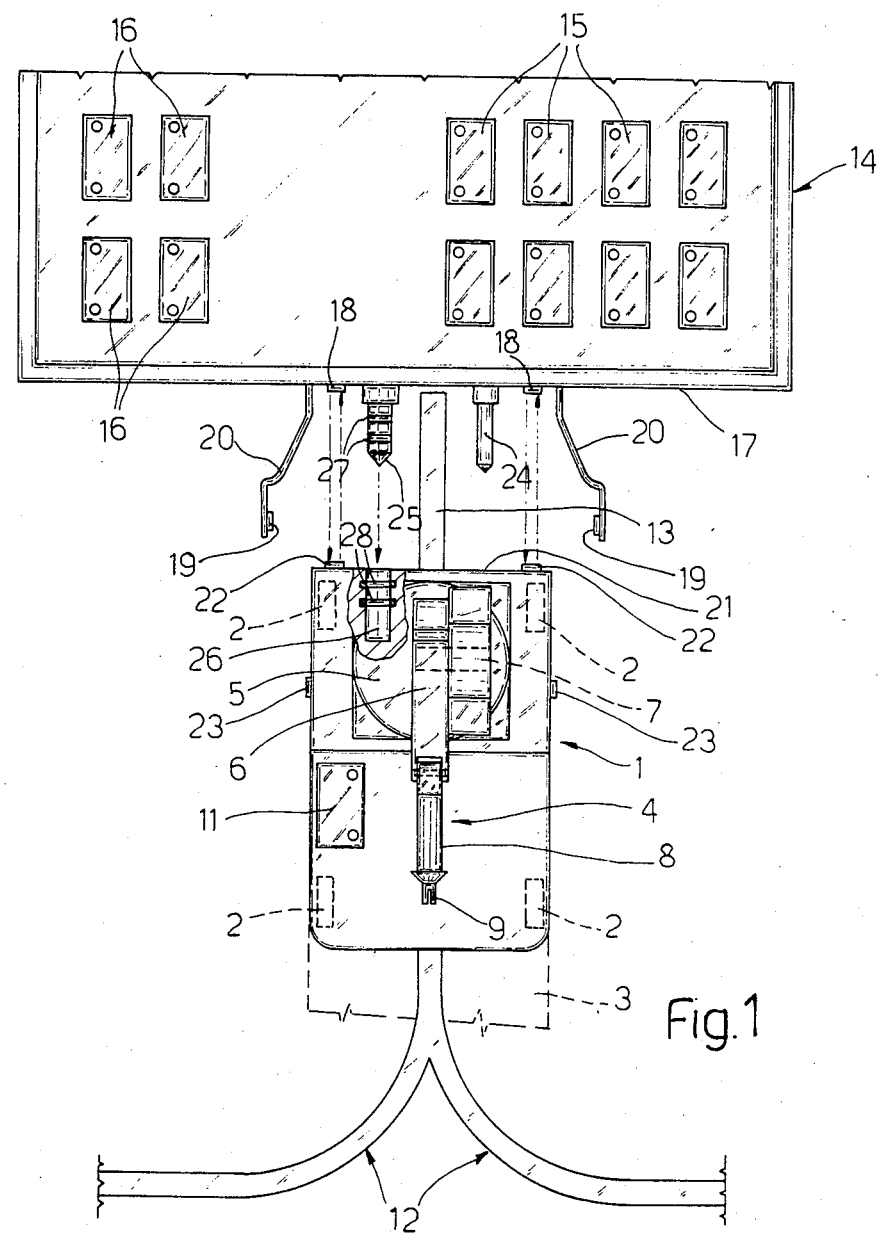
FIGS. 1 and 2 show plan views of a mobile operating-arm unit in two successive operating positions, with a station for automatically changing the electricity supply source according to the system taught by the present invention.

Number 1 in FIG. 1 indicates a mobile unit mounted on wheels 2, to which unit may be connected, in permanent or temporary manner, a truck 3 (partly shown by the dotted line), the said unit being fitted with a substantially known type of operating arm (robot) 4 having, in the specific example shown, a table 5 mounted for rotation about a vertical axis and fitted with a first arm 6 designed to move about a horizontal shaft 7. To the end of the said first arm 6 is hinged a second arm 8 fitted, at the other end, with a grip 9. The said mobile unit 1 is fitted with an electricity supply source comprising a battery 11, which fully supplies the motors powering the various parts on operating arm 4 as well as the motors powering the unit 1 which is guided along selective routes by means of magnetic tracks 12 and the control imparted by a processing unit which may be either stationary or fitted onto the unit 1.

A portion 13 of the said tracks 12, which portion constitutes an automatic guiding means for mobile unit 1, extends facing a station 14 for storing a number of charged batteries 15 and a number of rundown batteries 16 unloaded by mobile unit 1 in the manner described later on. In more detail, the said station 14 comprises systems, preferably automatic, for recharging the said batteries 16 and presents, on a front side 17, prearranged positioning means comprising a first pair of reference sensors 18 (conveniently photocells), for positioning mobile unit 1 in the manner described later on, and a second pair of sensors 19 (also conveniently comprising photocells) located on the respective end of mechanical guiding means comprising two arms 20 for positioning mobile unit 1.

The front side 21 of the unit 1 is fitted with prearranged positioning means comprising a pair of sensors 22 designed to cooperate with sensors 18 as described later on, whereas the sides of unit 1 are fitted with prearranged positioning means comprising a pair of sensors 23 designed to cooperate with the pair of fixed sensors 19 on arms 20.

From the front side 17 of station 14, there project prearranged positioning means or mechanical guide means consisting of two bodies 24 and 25 for guiding and positioning unit 1 inside which the said bodies 24 and 25 are designed to fit inside correspondng holes or prearranged positioning means 26 (only one of which is shown).

Body 25 presents mechanical locking means 27 designed to hook up automatically with corresponding locking members 28 inside hole 26 on unit 1. Coupling of the said members 27 and 28 closes a switch or electrical connecting means 30 (FIG. 3) connected between an auxiliary supply network 31 on station 14 and a pair of terminals 32 connected to a first pair of switch terminals 33 controlling a switch or switching means 34 which presents another pair of switch terminals 35 connected to the terminals of battery 11. The two fixed terminals of switch 34, on the other hand, are connected to a supply unit 36 which, besides supplying mobile unit 1 and operating arm 4, also supplies means for activating the said operating arm 4, said means consisting of an operating block 37 which receives, from sensor 38, a signal indicating the status of switch 30 and controls positioning of switch 34 by means of an actuator 39.

The automatic system for changing the battery 11 on mobile unit 1 with operating arm 4, according to the present invention, operates as follows.

Figure 2:
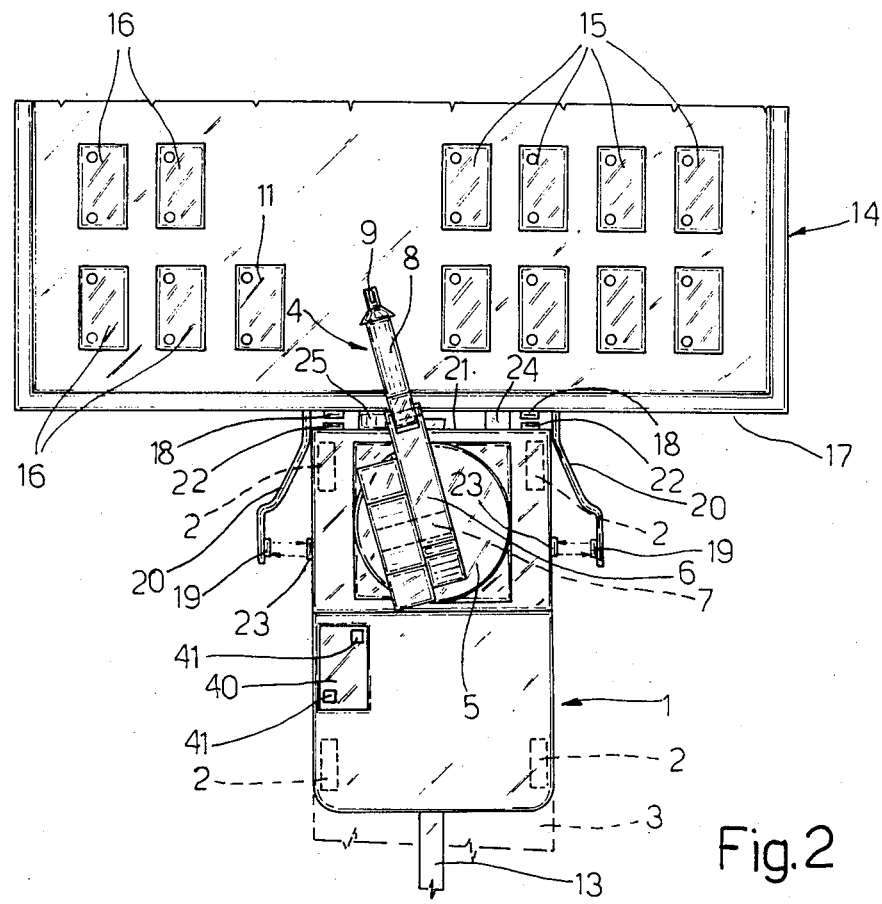

When the operating control system on the unit 1 detects a charge on battery 11 below a given prearranged threshold, the said system moves the unit 1 up to station 14 along magnetic track portion 13. Towards the end of its travel, mobile unit 1 is guided into a precise position by means of pairs of sensors 18 and 22, insertion of bodies 24 and 25 inside holes 26 (FIG. 2), positioning of the side walls of unit 1 on the initial inner portions of arms 20, and by means of pairs of sensors 19 and 23.

Figure 3:
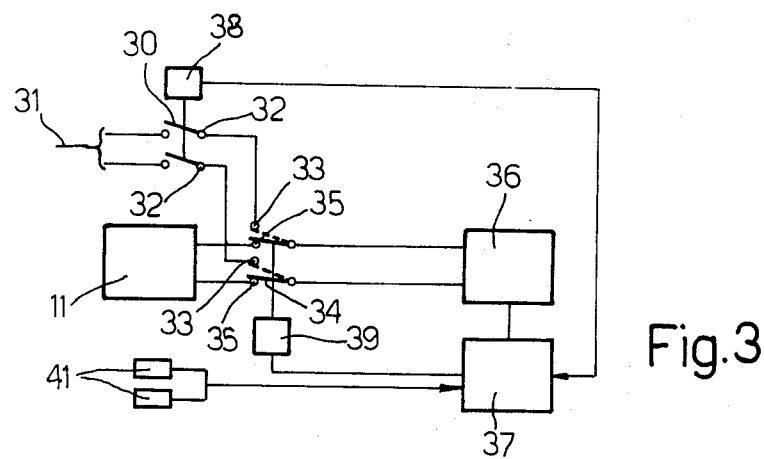
FIG. 3 shows a block diagram of a device on the mobile unit in FIGS. 1 and 2.

Upon unit 1 being set in the said prearranged position in relation to station 14, means 27 and 28 connect mechanically and automatically, which also results in automatic closing of switch 30. As shown in FIG. 3, this is detected by sensor 38, thus resulting in block 37 controlling, via actuator 39, displacement of switch 34, in such a manner as to disconnect the supply of battery 11 from unit 36 and connect the auxiliary supply from network 31.

Block 37 then automatically controls operation of arm 4 which, by means of grip 9, picks up the discharged battery 11 and places it in station 14 with the other batteries 16 awaiting recharging.

Grip 9 then picks up a new battery 15 which it places inside compartment 40 on unit 1, which compartment 40 is fitted with position sensors 41 for detecting battery replacement and controlling operating block 37 in such a manner as to bring operating arm 4 back to the idle position shown in FIG. 1, trip switch 34 so as to supply unit 36 from the newly-replaced battery 11, and move unit 1 away from station 14 and onto tracks 12 along which it is guided towards a successive operating cycle.

The advantages of the automatic system for changing the electricity supply source on a mobile operating-arm unit according to the present invention will be clear from the foregoing description.

In particular, long-distance and long-term mobility of the operating arm (robot) is assured by the presence of a sufficient electricity supply source located on the mobile unit supporting the arm. Furthermore, replacement of the said electricity supply source is performed in such a manner as to minimise downtime of the operating arm by virtue of the battery being replaced rapidly and automatically by the arm itself.

To those skilled in the art it will be clear that changes may be made to mobile unit 1 and operating arm 4 with its various positioning and locking sensors without, however, departing from the scope of the present invention.

What is claimed is:

1. In combination:
   a station including an auxiliary power supply network;
   at least one charged power supply source stored at said station;
   a mobile unit, an in-use power supply source carried on said unit, and an operating arm mounted to said unit switchably electrically connected to said in-use source, said arm being adapted to manipulate each of said in-use and charged sources;
   reversibly engageable means connecting said auxiliary network to said unit for powering said arm; and
   means for instructing said arm to engage said in-use source and move it from said unit to said station, and to subsequently engage said charged source and move it from said station to said unit in replacement of said in-use source, when said arm is powered by said auxiliary network.

2. The invention according to claim 1, further comprising means for aligning said mobile unit with respect to said station so as to ensure engagement of said means connecting said auxiliary network and said mobile unit.

3. The invention according to claim 1, wherein said station includes means for recharging said in-use source moved to said station by said arm.

4. The invention according to claim 1, further comprising means for automatically guiding said mobile unit towards said station.

5. The invention according to claim 2, wherein said aligning means comprises a plurality of sensors detecting the position of said mobile unit with respect to said station, and means responsive to said sensors for guiding movement of said mobile unit with respect to said station.

6. The invention according to claim 2, wherein said aligning means comprises at least one mechanical guide.

7. The invention according to claim 6, wherein said connecting means is incorporated in said at least one mechanical guide.

8. The invention according to claim 2, wherein said aligning means comprises means locking said mobile unit to said station.

9. The invention according to claim 1, wherein said instructing means is automatically activated upon engagement of said connecting means.

10. The invention according to claim 1, further comprising a material transport truck connected to said mobile unit.

11. The invention according to claim 2, further comprising means for switching said arm between connection to said in-use source and said auxiliary network, automatically responsive to engagement of said connecting means.

* * * * *